(12) United States Patent
Gopal et al.

(10) Patent No.: US 12,743,875 B2
(45) Date of Patent: Sep. 22, 2026

(54) CULTURE-AWARE RECOMMENDATION OVER VISUAL SCANNING IN DYNAMIC SOCIAL ENVIRONMENTS

(71) Applicant: International Business Machines Corporation, Armonk, NY (US)

(72) Inventors: Vasanthi M. Gopal, Plainsboro, NJ (US); Neil Delima, Scarborough (CA); Fernando Luiz Koch, Palm Beach Gardens, FL (US); Sachinkumar Jain, Shrewsbury, MA (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 18/372,418

(22) Filed: Sep. 25, 2023

(65) Prior Publication Data

US 2025/0104408 A1 Mar. 27, 2025

(51) Int. Cl.
*G06V 10/778* (2022.01)
*G06V 10/764* (2022.01)
*G06V 20/52* (2022.01)

(52) U.S. Cl.
CPC ........ *G06V 10/7788* (2022.01); *G06V 10/764* (2022.01); *G06V 20/52* (2022.01)

(58) Field of Classification Search
CPC ... G06V 10/7788; G06V 10/764; G06V 20/52
See application file for complete search history.

(56) References Cited

U.S. PATENT DOCUMENTS 6,333,986 B1 * 12/2001 Petty ........................ G01S 7/411 342/25 D
10,354,159 B2 7/2019 Savvides et al.
10,783,615 B2 9/2020 Ma et al.
11,068,530 B1 * 7/2021 Oringer ................. G06F 40/134
11,567,975 B1 * 1/2023 Day, Jr. ............. G06F 16/24547
2002/0069190 A1 * 6/2002 Geiselhart ........... G06F 16/3326
2008/0091634 A1 * 4/2008 Seeman ................. G06N 5/022 706/59
2019/0340202 A1 * 11/2019 Kandur Raja ........ G06F 40/274
2020/0193666 A1 6/2020 Cinnamon et al.
2020/0394430 A1 12/2020 Ahmed et al.

(Continued)

FOREIGN PATENT DOCUMENTS

JP 2013069045 A 4/2013
KR 101077788 B1 10/2011

*Primary Examiner* — John B Strege
(74) *Attorney, Agent, or Firm* — Teddi E. Maranzano

(57) ABSTRACT

An embodiment senses an object from an object screening system, and responsive to the sensed object, generates a context information based on the sensed object. The embodiment generates a cultural classification by a Culturally Aware Objects Model based in part on the context information wherein the Culturally Aware Objects Model is trained on a cultural factor of an object. The embodiment generates a moderated context information by a Sensitive Information Moderation Model based in part on the cultural classification and the context information wherein the Sensitive Information Moderation Model is trained on a privacy parameter. The embodiment also computes a recommendation by a Recommendation Component based in part on the moderated context information wherein the object screening system is updated with the recommendation.

17 Claims, 6 Drawing Sheets

(56) References Cited

U.S. PATENT DOCUMENTS

| | | | | |
|---|---|---|---|---|
| 2021/0165678 | A1* | 6/2021 | Vans | G06F 16/9538 |
| 2022/0230731 | A1* | 7/2022 | Gilutz | G06N 3/088 |
| 2022/0279010 | A1 | 9/2022 | Kair et al. | |
| 2023/0104313 | A1* | 4/2023 | Lucey | G06V 20/42 345/440 |
| 2023/0169619 | A1 | 6/2023 | Ahmed et al. | |
| 2024/0086760 | A1* | 3/2024 | Fraboni | G06N 20/00 |
| 2024/0202357 | A1* | 6/2024 | Peterson | G06F 21/6245 |

* cited by examiner

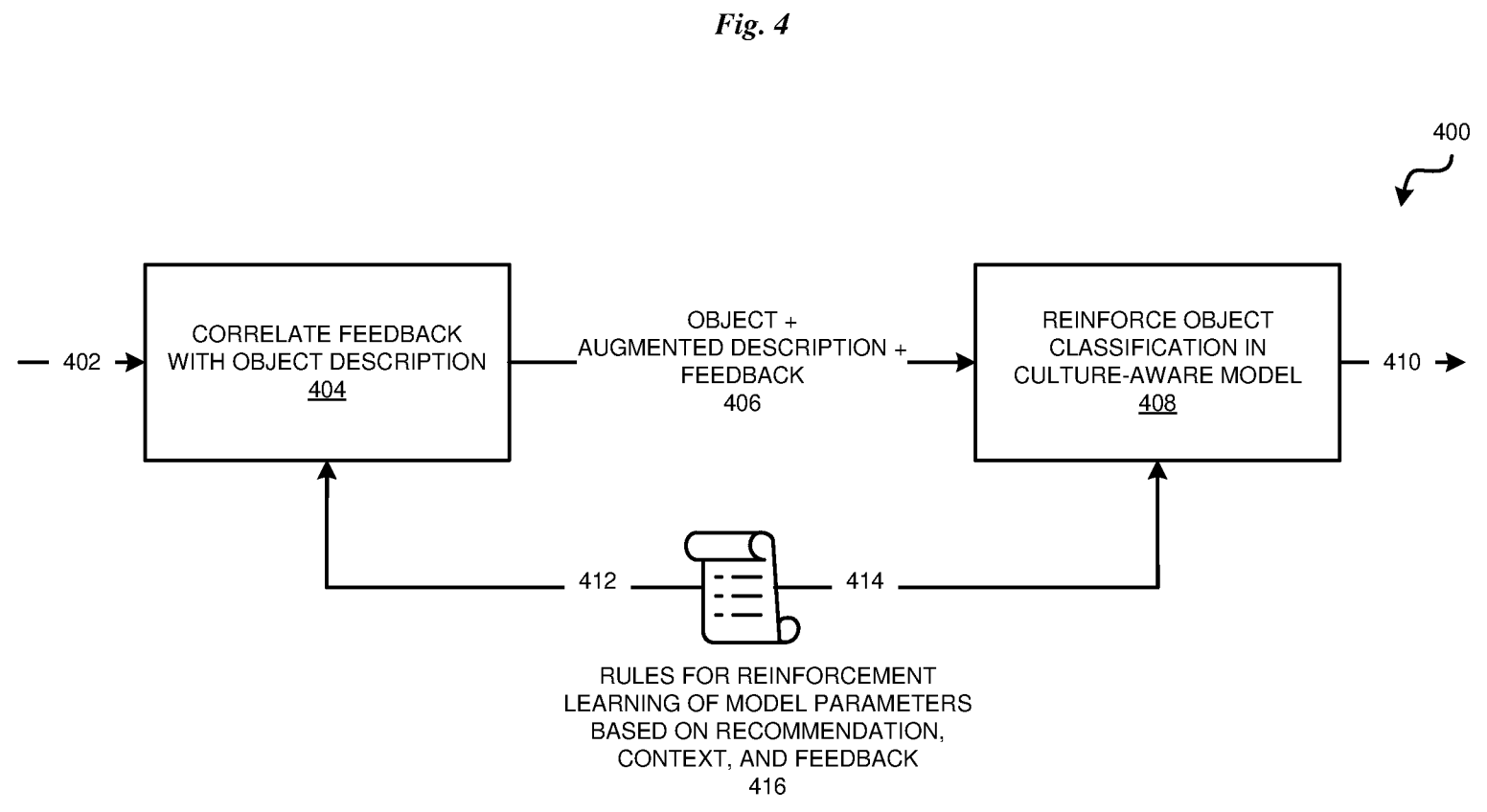

400

402

CORRELATE FEEDBACK WITH OBJECT DESCRIPTION
404

OBJECT + AUGMENTED DESCRIPTION + FEEDBACK
406

REINFORCE OBJECT CLASSIFICATION IN CULTURE-AWARE MODEL
408

410

412

414

RULES FOR REINFORCEMENT LEARNING OF MODEL PARAMETERS BASED ON RECOMMENDATION, CONTEXT, AND FEEDBACK
416

*Fig. 4*

CULTURE-AWARE RECOMMENDATION OVER VISUAL SCANNING IN DYNAMIC SOCIAL ENVIRONMENTS

BACKGROUND

The present invention relates generally to artificial intelligence. More particularly, the present invention relates to a method, system, and computer program for A Culture-Aware Recommendation over Visual Scanning in Dynamic Social Environments.

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

Security workers operating visual scanning machines, such as x-ray machines in airports, stadiums, and events, often face challenges in quickly assessing the threat potential of customers' objects through blurred images. False positives not only impact the quality of service but also result in additional work and discomfort for both customers and agents. Furthermore, privacy concerns arise as scanning machines in airports can be highly intrusive, potentially revealing personal or sensitive information.

Current techniques of object screening systems focus on identifying threat potential in objects without the contextual, cultural or privacy factors. Therefore, these techniques do not consider important factors to provide informative recommendations to security workers, enhancing the quality and speed of their work while considering privacy concerns.

SUMMARY

The illustrative embodiments provide for A Culture-Aware Recommendation over Visual Scanning in Dynamic Social Environments. An embodiment includes sensing an object from an object screening system, responsive to the sensed object, generating a context information based on the sensed object. The embodiment includes generating a cultural classification by a Culturally Aware Objects Model based in part on the context information wherein the Culturally Aware Objects Model is trained on a cultural factor of an object. The embodiment includes generating a moderated context information by a Sensitive Information Moderation Model based in part on the cultural classification and the context information wherein the Sensitive Information Moderation Model is trained on a privacy parameter. The embodiment also includes computing a recommendation by a Recommendation Component based in part on the moderated context information wherein the object screening system is updated with the recommendation. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 4 depicts a component diagram in accordance with an illustrative embodiment;

DETAILED DESCRIPTION

Figure 1:
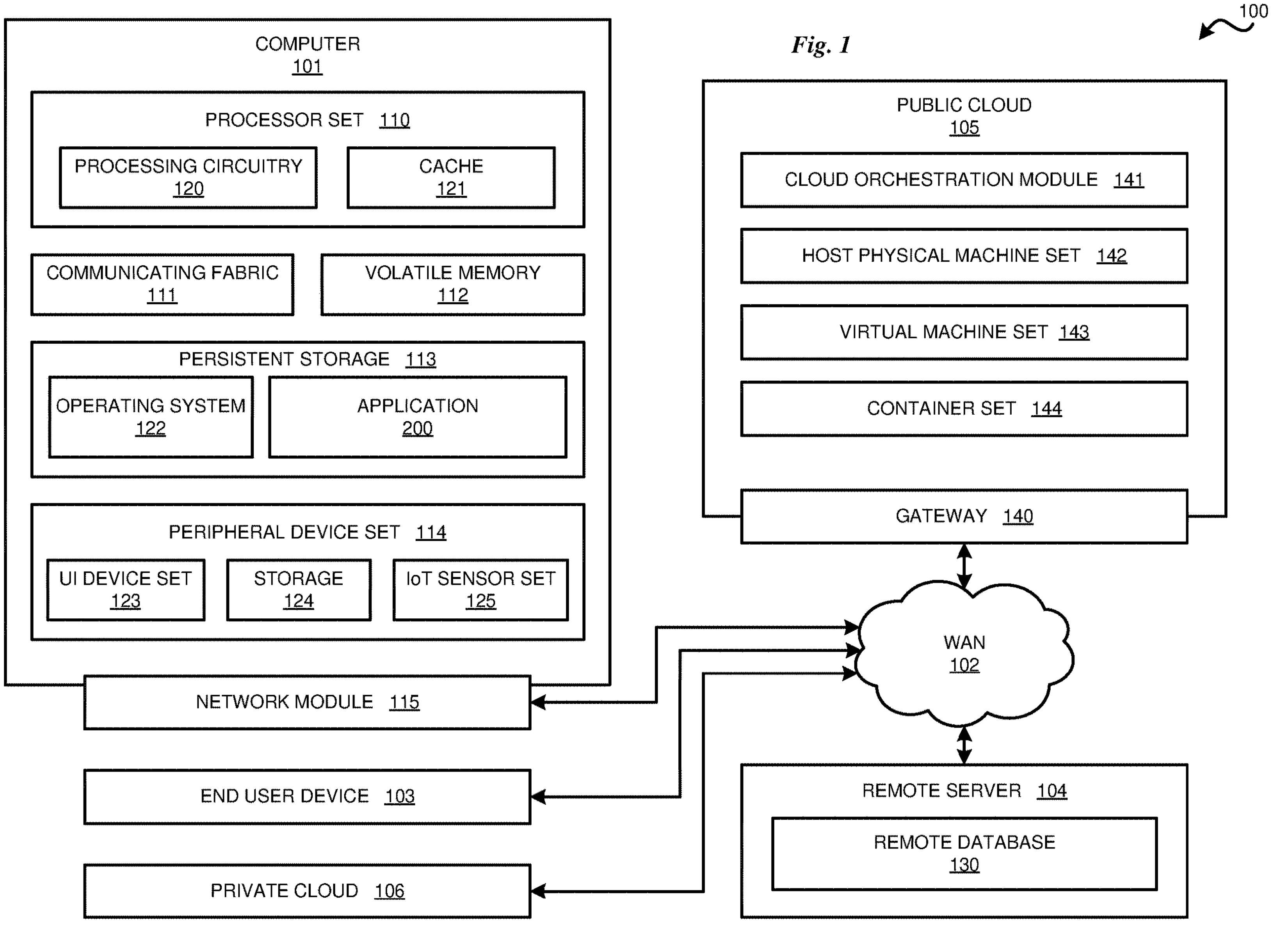
FIG. 1 depicts a block diagram of a computing environment in accordance with an illustrative embodiment.

Security workers operating visual scanning machines, such as x-ray machines in airports, stadiums, and events, often face challenges in quickly assessing the threat potential of customers' objects through blurred images. False positives not only impact the quality of service but also result in additional work and discomfort for both customers and agents. Furthermore, privacy concerns arise as scanning machines in airports can be highly intrusive, potentially revealing personal or sensitive information.

Current techniques of object screening systems focus on identifying threat potential in objects without the contextual, cultural or privacy factors. Therefore, these techniques do not consider important factors to provide informative recommendations to security workers, enhancing the quality and speed of their work while considering privacy concerns.

The present disclosure addresses the deficiencies described above by providing a method, a machine-readable medium, and a system for A Culture-Aware Recommendation over Visual Scanning in Dynamic Social Environments. Embodiments described herein describe sensing an object from an object screening system, responsive to the sensed object, generating a context information based on the sensed object. The embodiment includes generating a cultural classification by a Culturally Aware Objects Model based in part on the context information wherein the Culturally Aware Objects Model is trained on a cultural factor of an object. The embodiment includes generating a moderated context information by a Sensitive Information Moderation Model based in part on the cultural classification and the context information wherein the Sensitive Information Moderation Model is trained on a privacy parameter. The embodiment also includes computing a recommendation by a Recommendation Component based in part on the moderated context information wherein the object screening system is updated with the recommendation.

Illustrative embodiments include executing a reinforced learning algorithm on the Culturally Aware Objects Model based in part on a feedback of a user of the object screening system for the recommendation.

Illustrative embodiments include wherein the Culturally Aware Objects Model generates a ranked set comprising of the context information and the cultural classification.

Illustrative embodiments include wherein the Culturally Aware Objects Model is trained by online learning.

Illustrative embodiments include wherein the Culturally Aware Objects Model comprises fine tuning a pre-trained machine learning model with a dataset of an object and an associated cultural factor of the object.

Illustrative embodiments include wherein the recommendation comprises an explanation of the culture classification of the moderated context information.

Illustrative embodiments also include wherein generating by the Sensitive Information Moderation Model of the moderated context information comprises removing personal information from the cultural classification and the context information.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Data center environment 100 contains an example of an environment for the execution of at least some of the computer code involved in performing the inventive methods, such as an Application module 200 that provides A Culture-Aware Recommendation over Visual Scanning in Dynamic Social Environments. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

The process software A Culture-Aware Recommendation over Visual Scanning in Dynamic Social Environments is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 2:
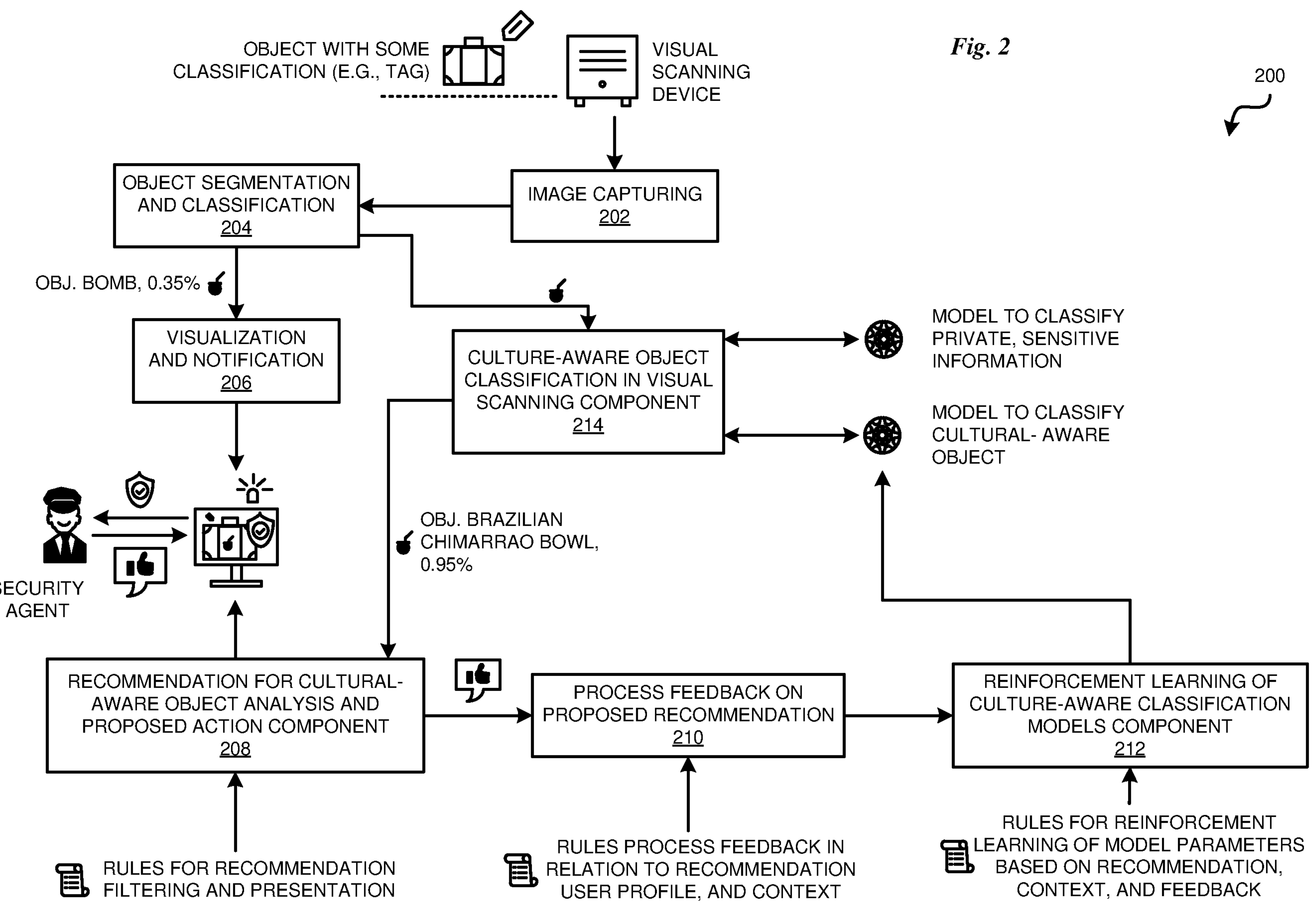
FIG. 2 depicts a diagram in accordance with an illustrative embodiment.

FIG. 2 depicts a diagram 200 in accordance with an illustrative embodiment. In a particular embodiment, the diagram 200 is representative of aspects of the application 200 of FIG. 1.

In the illustrated embodiment, an image is captured or sensed 202 from a visual scanning device which is inputted or senses an object with some identifier such as a baggage tag. The object is segmented and classified 204, generating a context information, and visualized and the end user notified 206. The context information together with an object identifier is also inputted into the Culturally Aware Object Classification in Visual Scanning Component 214 which comprises a Culturally Aware Objects Model and a Sensitive Information Moderation Model, to classify private and sensitive information. The cultural classification is generated by the Culturally Aware Objects Model. In some embodiments, the Culturally Aware Objects Model generates a ranked set comprising of the context information and the cultural classification. The moderated context information is generated by the Sensitive Information Moderation Model based in part on the on the cultural classification and the context information, and is then outputted into the Recommendation for Cultural-aware Object and Proposed Action Component (Recommendation Component) 208 that applies rules for recommendation, filtering and presentation to compute a recommendation for the end user. In an embodiment, the user gives feedback for the recommendation, which is processed 210 using rules to process feedback in relation to recommendation, user profile, and context, and rules of reinforced learning applied to the Culturally Aware Objects Model 212.

In a use case example of the illustrated embodiment, a bag with an identifying tag is screened by a visual scanning device, an image is captured 202, an object is segmented and classified 204 from the image, and the security agent is notified 206 that an object in the bag is likely (35%) to be a dangerous device. Contemporaneously, the object and object identifier are inputted into the Culturally Aware Object Classification in Visual Scanning Component 214, and based on the Culturally Aware Objects Model which generates a ranking of the object, cultural classification and context information, and the Sensitive Information Moderation Model, a recommendation is made to the security agent that the object is likely (95%) to be a Brazilian Chimarrao bowl. The recommendation also includes an explanation of the cultural factors and context information but with sensitive and personal information removed.

Figure 3:
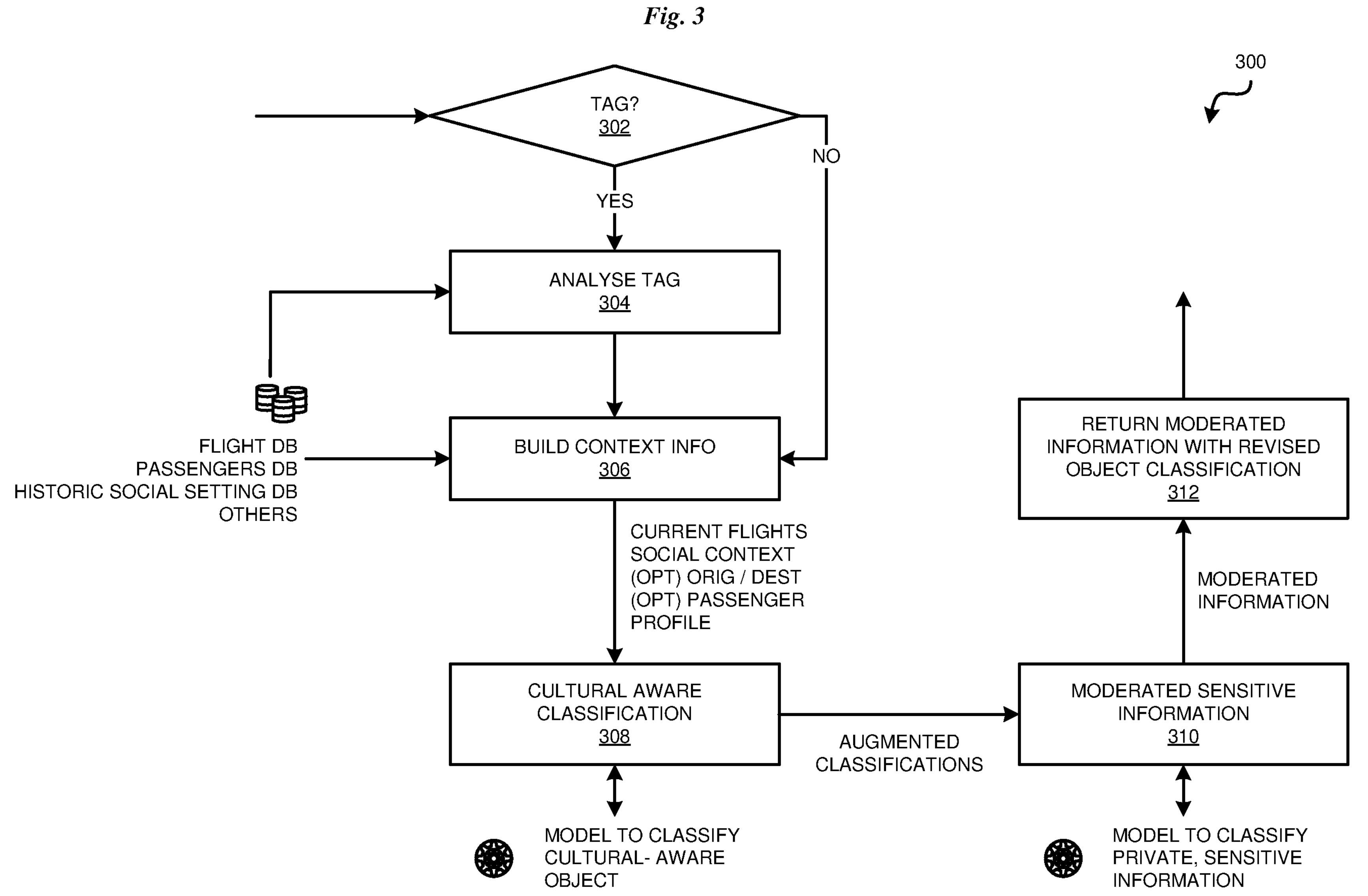
FIG. 3 depicts a flowchart diagram in accordance with an illustrative embodiment.

FIG. 3 depicts a flowchart diagram 300 in accordance with an illustrative embodiment. In a particular embodiment, the components of the flowchart 300 are representative of aspects of the application 200 of FIG. 1.

In the illustrated embodiment, if an object is sensed, its identifier for example a baggage tag 302 is analyzed 304 using flight, passengers or historical setting databases. If there is no tag, continue to building context information 306 based on an auxiliary identifier described below. In some embodiments, the object image is captured and received by the next step together with the identifier. The context information is constructed for example by correlating information from various sources, such as an event database, user profile, social setting, or historic social setting. For instance, in an airport, this could include current flights, information about the passenger's origin and destination, current social context of the airport such as what flights have landed or what are the most likely origins at a given time. Next, culturally aware classification is performed on context information 308 by processing the context information against the Culturally Aware Objects Model that classifies culture-aware objects, taking into account cultural factors associated with certain objects found in the luggage. Sensitive information moderation is performed 310 by submitting the resulting cultural classification and the context information to the Sensitive Information Moderation Model that classifies privacy-sensitive information based on a privacy parameter such as personal information of the passenger or details about the flight. In some embodiments, the moderation of sensitive information may comprise removing personal information from the cultural classification and the context information. The moderated context information is returned to the system 312. In an embodiment, the moderated context information with revised object classification is inputted into the Recommendation Component along with an explanation of the new classification based on cultural factors and context information. This helps to ensure transparency and accountability in the scanning process.

In some embodiments, the Culturally Aware Objects Model comprises fine tuning a pre-trained machine learning model with a dataset of an object and an associated cultural factor of the object. For example, the selected model is trained on the prepared data and parameters adjusted to improve accuracy. This would involve feeding the model with datasets of objects and their associated cultural factors.

Online learning may also be used to continuously update the Culture-Aware Classification Model with new data, allowing it to adapt to changing contexts and improve its accuracy and efficiency in near real-time. The fine-tuned model may also be tested for accuracy and performance using a separate dataset for evaluation, or using cross-validation techniques.

FIG. 4 depicts a component diagram 400 in accordance with an illustrative embodiment. In a particular embodiment, the components 400 are representative of aspects of the application 200 of FIG. 1.

In the illustrated embodiment, feedback from the screening system is sensed 402 and is correlated with the object 404. In an embodiment, feedback for the recommendation outputted by the Recommendation Component is received from a user such as a security agent. The feedback may be correlated with the object identifier and the feedback including an augmented description of the object 406 may also be used to adjust the rules and algorithms of the Culture-Aware Classification Model 408 through reinforcement learning techniques or rules. The reinforcement learning techniques or rules 416 may be applied to the correlation 412 and to adjusting the Culture-Aware Classification Model 414 and deployed to the model 410. For example, the reinforcement learning techniques may include Q-learning, policy gradient methods, or deep reinforcement learning.

Figure 5:
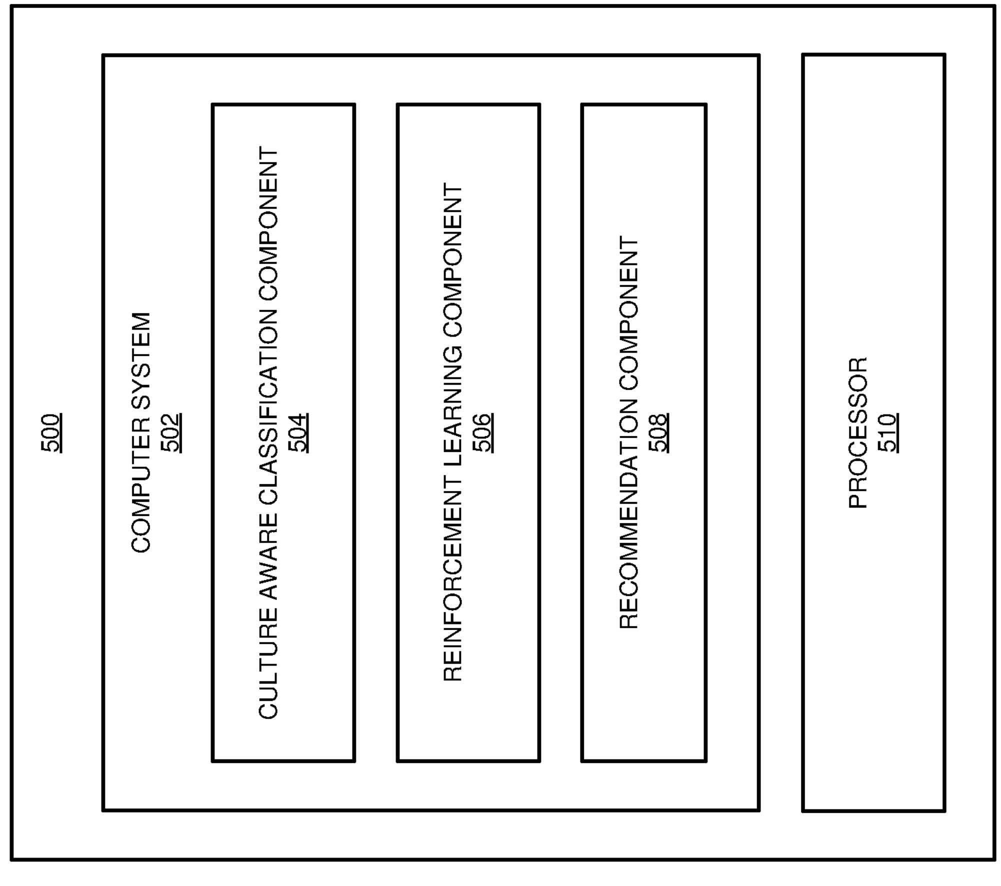
FIG. 5 depicts a system diagram in accordance with an illustrative embodiment.

FIG. 5 depicts a system diagram 500 in accordance with an illustrative embodiment. In a particular embodiment, the components 500 are representative of aspects of the application 200 of FIG. 1.

In the illustrated embodiment, the computer system 502 comprising a processor 510 which executes the Culture Aware Classification Component (Culturally Aware Object Classification in Visual Scanning Component) 504, the Reinforcement Learning Component 506, and the Recommendation Component 508.

Figure 6:
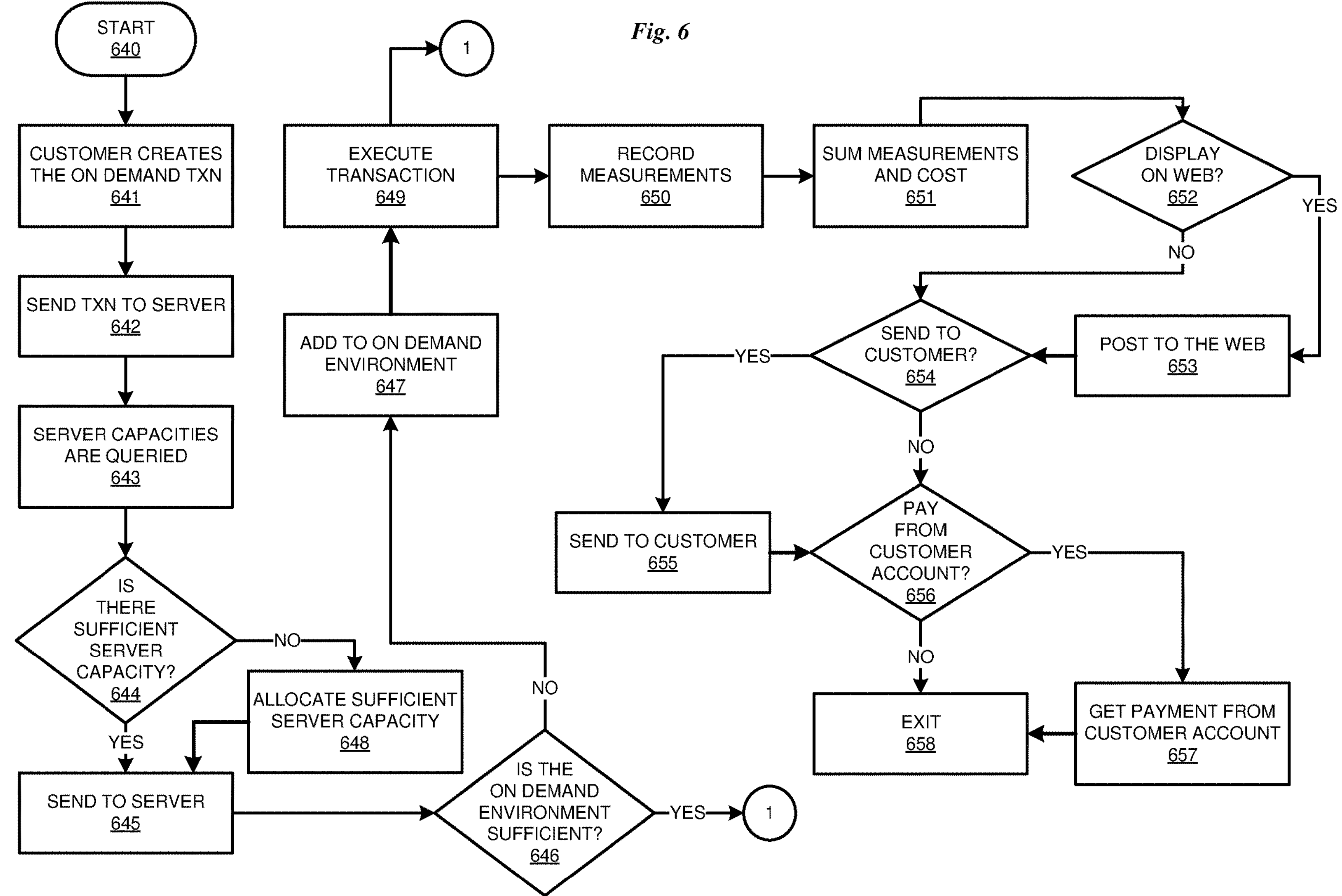
FIG. 6 depicts a flowchart diagram of an example On Demand process in accordance with an illustrative embodiment.

FIG. 6 depicts a flowchart diagram of an example On Demand process in accordance with an illustrative embodiment.

Step 640 begins the On Demand process. A transaction is created that contains the unique customer identification, the requested service type, and any service parameters that further specify the type of service (641). The transaction is then sent to the main server (642). In an On Demand environment, the main server can initially be the only server, and then as capacity is consumed other servers are added to the On Demand environment.

The server central processing unit (CPU) capacities in the On Demand environment are queried (643). The CPU requirement of the transaction is estimated, and then the server's available CPU capacity in the On Demand environment is compared to the transaction CPU requirement to see if there is sufficient CPU available capacity in any server to process the transaction (644). If there is not sufficient server CPU available capacity, then additional server CPU capacity is allocated to process the transaction (648). If there was already sufficient available CPU capacity, then the transaction is sent to a selected server (645).

Before executing the transaction, a check is made of the remaining On Demand environment to determine if the environment has sufficient available capacity for processing the transaction. This environment capacity consists of such things as, but not limited to, network bandwidth, processor memory, storage etc. (646). If there is not sufficient available capacity, then capacity will be added to the On Demand environment (647). Next the required software to process the transaction is accessed, loaded into memory, and then the transaction is executed (649).

The usage measurements are recorded (650). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (651).

If the customer has requested that the On Demand costs be posted to a web site (652), then they are posted thereto (653). If the customer has requested that the On Demand costs be sent via e-mail to a customer address (654), then they are sent (655). If the customer has requested that the On Demand costs be paid directly from a customer account (656), then payment is received directly from the customer account (657). On Demand process proceeds to 658 and exits.

While it is understood that the process software A Culture-Aware Recommendation over Visual Scanning in Dynamic Social Environments may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Introduction

Loading the process software directly on the client, server, and proxy computers by loading a storage medium such as a CD, DVD, etc.

Automatically or semi-automatically deploying the process software into a computer system by sending it to a central server or a group of central servers. The process software is then downloaded into the client computers that will execute the process software.

Sending the process software directly to the client system via e-mail. The process software is then either detached to a directory or loaded into a directory by executing a set of program instructions that detaches the process software into a directory.

Sending the process software directly to a directory on the client computer hard drive.

When there are proxy servers, the process will select the proxy server code, determine on which computers to place the proxy servers' code, transmit the proxy server code, and then install the proxy server code on the proxy computer. The process software will be transmitted to the proxy server and then it will be stored on the proxy server.

General Description

While it is understood that the process software An Intelligent Orchestration System for Emotion Contagion in Multi-Human to Multi-Agent Interactions may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

capturing an image of a physical object inside a bag from an object screening system, wherein the bag includes an identifier;

generating a context information for the physical object based on the image;

generating, contemporaneously with the generating the context information a cultural classification by a Culturally Aware Objects Model based in part on the context information, wherein the Culturally Aware Objects Model is trained on a cultural factor of an object, and the cultural classification is based on the identifier;

generating a moderated context information by a Sensitive Information Moderation Model based in part on the cultural classification and the context information wherein the Sensitive Information Moderation Model is trained on a privacy parameter, wherein the Culturally Aware Objects Model comprises fine tuning a pre-trained machine learning model with a dataset of an object and an associated cultural factor of the object to adjust an accuracy of the context information; and computing a recommendation by a Recommendation Component based in part on the moderated context information wherein the object screening system is updated with the recommendation of a proposed action for the physical object.

2. The computer-implemented method of claim 1, further comprising executing a reinforced learning algorithm on the Culturally Aware Objects Model based in part on a feedback of a user of the object screening system for the recommendation.

3. The computer-implemented method of claim 1, wherein the Culturally Aware Objects Model generates a ranked set comprising of the context information and the cultural classification.

4. The computer-implemented method of claim 1, wherein the Culturally Aware Objects Model is trained by online learning.

5. The computer-implemented method of claim 1, wherein the recommendation comprises an explanation of the culture classification of the moderated context information.

6. The computer-implemented method of claim 1, wherein generating by the Sensitive Information Moderation Model of the moderated context information comprises removing personal information from the cultural classification and the context information.

7. A computer program product comprising one or more computer readable storage media, and program instructions collectively stored on the one or more computer readable storage media, the program instructions executable by a processor to cause the processor to perform operations comprising:

capturing an image of a physical object inside a bag from an object screening system, wherein the bag includes an identifier;

generating a context information for the physical object based on the image;

generating, contemporaneously with the generating the context information a cultural classification by a Culturally Aware Objects Model based in part on the context information, wherein the Culturally Aware Objects Model is trained on a cultural factor of an object, and the cultural classification is based on the identifier;

generating a moderated context information by a Sensitive Information Moderation Model based in part on the cultural classification and the context information wherein the Sensitive Information Moderation Model is trained on a privacy parameter, wherein the Culturally Aware Objects Model comprises fine tuning a pre-trained machine learning model with a dataset of an object and an associated cultural factor of the object to adjust an accuracy of the context information; and computing a recommendation by a Recommendation Component based in part on the moderated context information wherein the object screening system is updated with the recommendation of a proposed action for the physical object.

8. The computer program product of claim 7, further comprising executing a reinforced learning algorithm on the Culturally Aware Objects Model based in part on a feedback of a user of the object screening system for the recommendation.

9. The computer program product of claim 7, wherein the Culturally Aware Objects Model generates a ranked set comprising of the context information and the cultural classification.

10. The computer program product of claim 7, wherein the Culturally Aware Objects Model is trained by online learning.

11. The computer program product of claim 7, wherein the recommendation comprises an explanation of the culture classification of the moderated context information.

12. The computer program product of claim 7, wherein generating by the Sensitive Information Moderation Model of the moderated context information comprises removing personal information from the cultural classification and the context information.

13. A computer system comprising a processor and one or more computer readable storage media, and program instructions collectively stored on the one or more computer readable storage media, the program instructions executable by the processor to cause the processor to perform operations comprising:

capturing an image of a physical object inside a bag from an object screening system, wherein the bag includes an identifier;

generating a context information for the physical object based on the image;

generating, contemporaneously with the generating the context information a cultural classification by a Culturally Aware Objects Model based in part on the context information, wherein the Culturally Aware Objects Model is trained on a cultural factor of an object, and the cultural classification is based on the identifier;

generating a moderated context information by a Sensitive Information Moderation Model based in part on the cultural classification and the context information wherein the Sensitive Information Moderation Model is trained on a privacy parameter, wherein the Culturally Aware Objects Model comprises fine tuning a pre-trained machine learning model with a dataset of an object and an associated cultural factor of the object to adjust an accuracy of the context information; and computing a recommendation by a Recommendation Component based in part on the moderated context information wherein the object screening system is updated with the recommendation of a proposed action for the physical object.

14. The computer system of claim 13, further comprising executing a reinforced learning algorithm on the Culturally Aware Objects Model based in part on a feedback of a user of the object screening system for the recommendation.

15. The computer system of claim 13, wherein the Culturally Aware Objects Model generates a ranked set comprising of the context information and the cultural classification.

16. The computer system of claim 13, wherein the recommendation comprises an explanation of the culture classification of the moderated context information.

17. The computer system of claim 13, wherein generating by the Sensitive Information Moderation Model of the moderated context information comprises removing personal information from the cultural classification and the context information.

* * * * *